Jan. 13. 1925.
A. J. BERRIEN
WATERING TANK
Filed Sept. 29, 1923    2 Sheets-Sheet 1
1,523,046
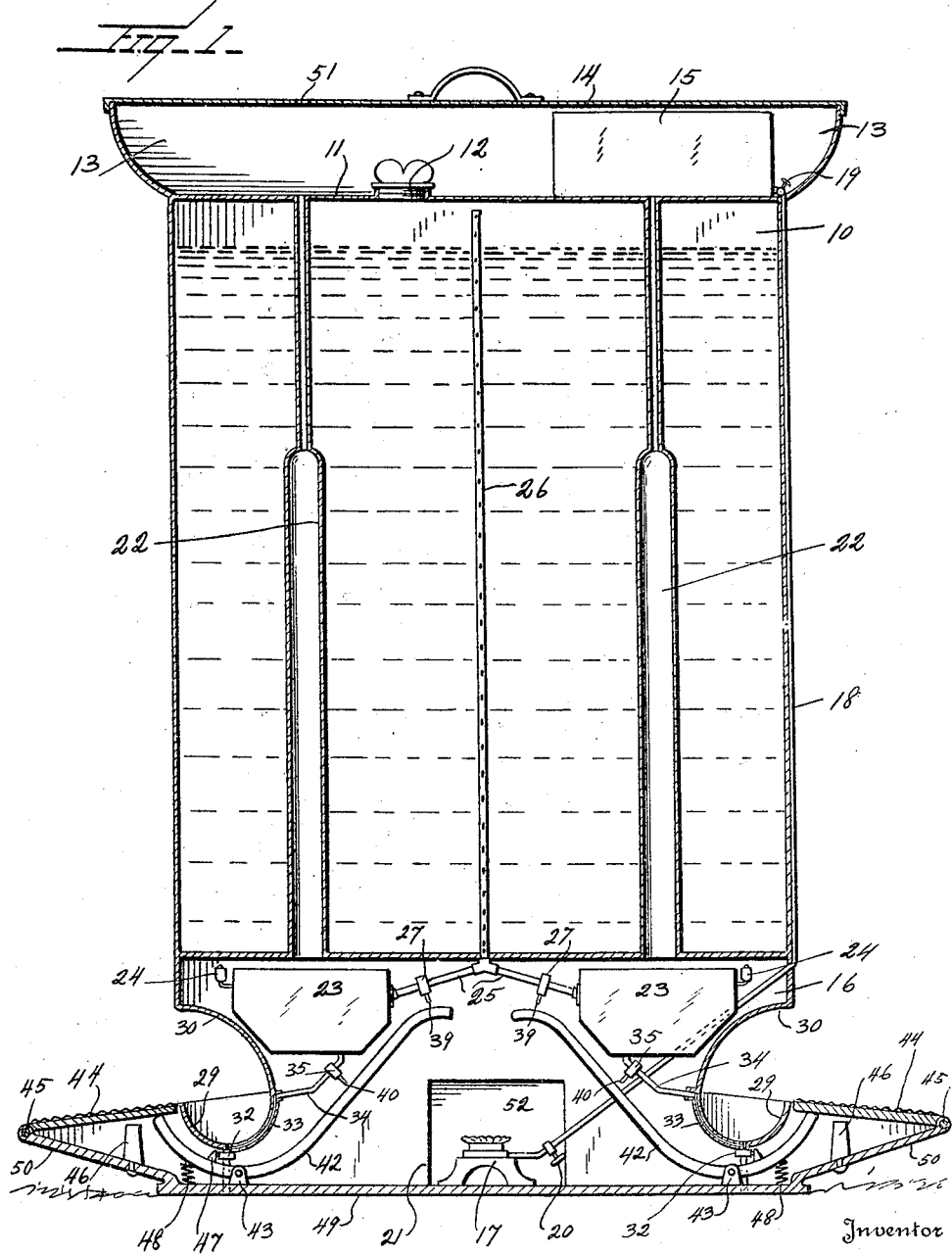
Inventor
A.J. Berrien
By Watson E. Coleman
Attorney

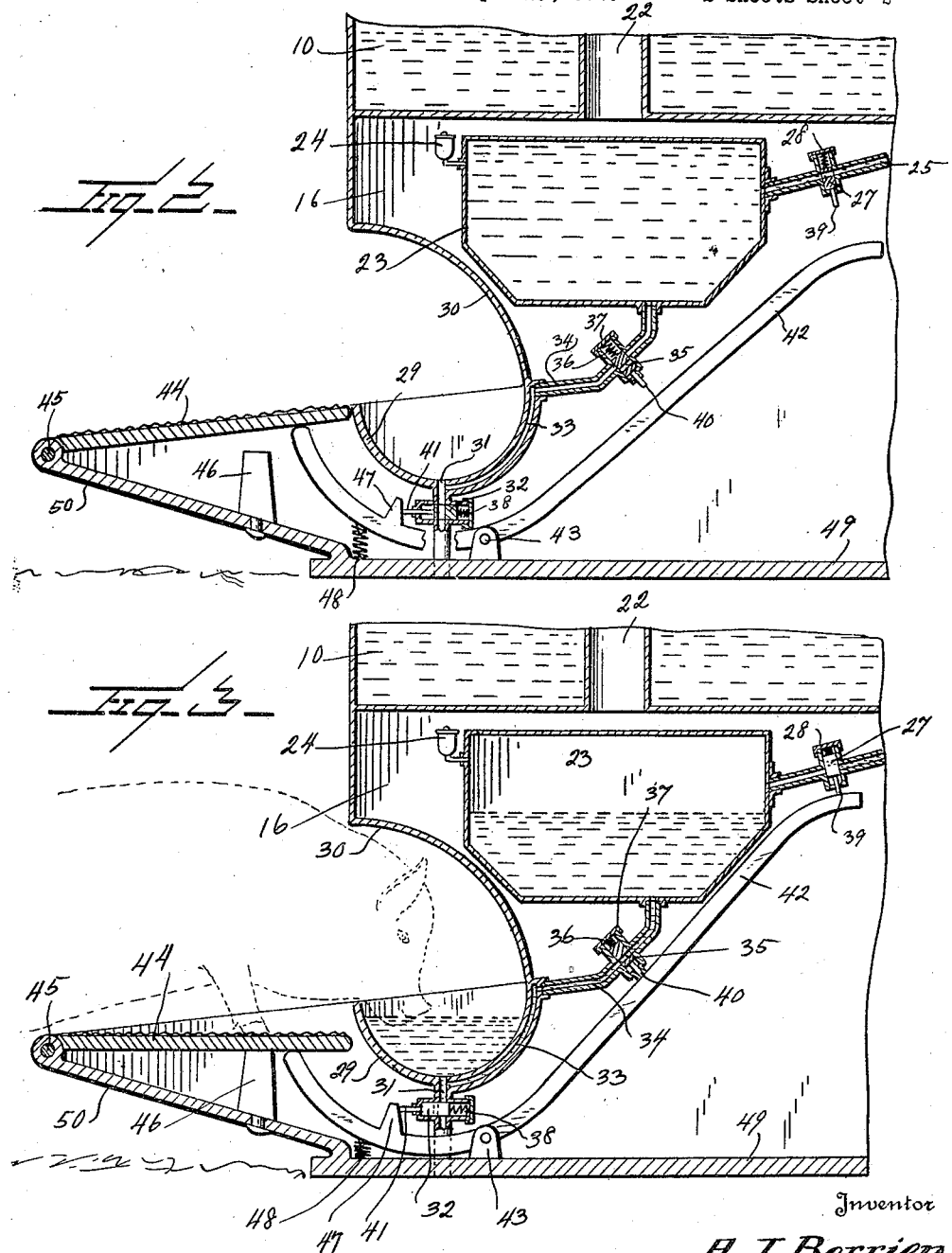

Patented Jan. 13, 1925.

1,523,046

UNITED STATES PATENT OFFICE.

ALFRED JAMES BERRIEN, OF YANKTON, SOUTH DAKOTA.

WATERING TANK.

Application filed September 29, 1923. Serial No. 665,584.

*To all whom it may concern:*

Be it known that I, ALFRED JAMES BERRIEN, a citizen of the United States, residing at Yankton, in the county of Yankton and State of South Dakota, have invented certain new and useful Improvements in Watering Tanks, of which the following is a specification, reference being had to the accompanying drawings.

This invention relates to tanks for supplying water to animals, and particularly to a tank of such construction that the water is supplied automatically when the animals go to the tank to drink.

One of the objects of this invention is to provide a tank which is automatic in its action and wherein only so much water is supplied to the animal as the animal will use so that fresh water is supplied to each animal.

A further object is to provide a watering tank of this character so constructed that the water is warmed, thus rendering the tank capable of use during the winter.

A still further object is to provide treadle operated means for causing the water to flow from an auxiliary tank into the bowl or pan from which the animal drinks, and provide means whereby the auxiliary tank may be again filled from the main tank when the animal steps off the treadle, and in this connection to provide means whereby when the animal steps off the treadle that the bowl or trough from which the animal drinks shall be emptied.

Other objects have to do with the details of construction and arrangement of parts whereby the tank is rendered compact, convenient and practical.

My invention is illustrated in the accompanying drawings, wherein:—

Figure 1 is a vertical longitudinal sectional view of a tank constructed in accordance with my invention;

Figure 2 is an enlarged detail sectional view of a portion of the tank showing the valves in the positions occupied by them when the treadle is raised;

Figure 3 is a like view to Figure 2 but showing the parts in the positions occupied when the treadle is depressed under the weight of a hog or other animal.

Referring to these drawings, 10 designates the main supply tank, which is closed at its upper end by means of a plate 11 having a filling opening normally closed by a plug 12. This main supply tank has above the plate 11 the compartment 13 normally closed by a cap or lid 14. Within this compartment 13 there is disposed a fuel supply tank 15. The main tank 10 is supported upon a hollow base portion 16, upon the bottom of which is disposed the heater 17 which is illustrated as a gasoline heater connected by a supply pipe 18 with the tank 15, this supply pipe being provided with a suitable cutoff valve 19 and with a regulating valve 20 for the burner.

The burner may be of any suitable construction and I do not wish to be limited thereto. Preferably one wall of the base 16 is provided with a door 21 whereby access may be had to the burner for cleaning. Extending upward from the bottom of the main tank 10 and opening through this bottom and through the plate 11 are heating tubes 22 illustrated as having an enlarged diameter at their lower portions so that the heat which is generated by the lamp 17 may rise up through the casings or compartments 16 and pass up through these tubular members, thus heating the water within the main tank.

Disposed within the compartment 16 beneath the bottom of the main tank are one or more auxiliary tanks 23, each having an air inlet valve 24, and each of these compartments being connected by a pipe 25 to a vertical pipe 26 disposed within the main tank and perforated along its length so that the water in the main tank will pass down through this pipe 26 and so to the auxiliary tanks 23.

In the pipe 25 is disposed a valve 27 (see Figures 2 and 3), which valve is shown as a sliding valve normally urged to an open position by a spring 28 and in this open position permitting the flow of liquid from the pipe 25 into the auxiliary tank 23. The side wall of the tank 10 at a suitable height below the bottom is inwardly extended, then extends downward and upward to form a bowl or trough 29, there being an opening between the forward edge of this trough and the upper end of the wall 30 large enough for the animal to insert its head. Each trough 29 has a vertical drain passage 31 at its bottom, the outlet from which is controlled by the valve 32. Communicating with this passage 31 is a duct 33 which has communication through a pipe 34 with the corresponding auxiliary tank 23. Disposed in the length of this pipe 34 is a valve casing 37 having therein a sliding valve 35 normally urged to a closed position by a spring 36. The valve 32 is normally urged to a closed position by the spring 38.

The valve 27 has a stud 39 projecting downward through the valve casing. The valve 35 has a like stud 40, and the valve 32 is provided with a stud 41, each of these studs projecting through the corresponding valve casing. Pivotally mounted below the trough or bowl 29 is a lever 42, this lever being shown as pivoted upon a bracket 43 and being curved to extend beneath the trough or bowl 29 and having one arm of the lever extending upward and inward at an angle and bearing against the stud 40 and the stud 39. The outer end of the lever extends upward and forward and is disposed beneath a depressible platform or treadle 44 which is pivoted at 45. This platform or treadle is limited in its downward movement by an abutment 46. The platform or treadle rests upon the upper extremity of the outer end of the lever 42. The stud 41 of valve 32 is engaged by an upwardly projecting lug 47 on the lever 42. The forward end of the lever is normally raised by a spring 48.

The base plate 49 which forms the bottom of the chamber 16 is laterally extended, as at 50, beyond the outer edge of the corresponding trough 29, and to the outer edge portion of this part 50 the treadle 44 is pivoted. This treadle 44 or platform when it is raised is practically coincident with the outer edge of the trough 29 so that the hot air cannot escape to any appreciable extent. Of course, when the platform or treadle is depressed, as in Figure 3, a small opening is formed but only a relatively small amount of hot air can escape under these circumstances.

Normally the trough or bowl 29 is empty of water while the auxiliary tank 23 is filled with water. Now when the animal steps upon the treadle 44, the depression of the treadle under its weight causes the depression of the forward end of the corresponding lever 42. When the lever is in the position shown in Figure 2, the lug 47 holds the valve 32 in its open position but the upwardly and inwardly extending arm of the lever is out of contact with the studs 39 and 40. When the animal steps upon the treadle, the forward end of the lever is depressed, rocking the outer end of the lever downward, thus permitting the valve 32 to close and the upper portion of the lever strikes the studs 39 and 40, causing the valve 27 to close, thus cutting off communication between the tank 23 and the supply pipe 25 and the valve 35 is opened, thus opening communication between the tank 23 and the bowl or trough 29. Water will flow from the tank 23 into the trough 29 in an amount approximately equal to that which the animal is likely to drink or an amount slightly greater so that the bowl will be sufficiently filled. When the animal drinks, and when it is satisfied, it steps off of the treadle 44, the spring 48 immediately causes the treadle to rise and causes the forward end of the lever 42 to rise, the lug 47 then pushes inward on the valve 32, which opens the outlet passage 31 and the upper portion of the lever immediately leaves the studs 39 and 40. The valve 35 under these circumstances will close, the valve 27 will open and fresh water from the tank 10 will pass into the auxiliary tank 23, filling this tank. Thus it will be seen that no water remains in the bowl 29 but that this bowl is completely drained so that when the next animal comes to drink entirely fresh water will flow into the bowl 29. This water will be heated, the water in the main tank being warmed by the hot air filling the tubes 22 and the hot air beneath the bottom of the main tank, and further by the hot air surrounding the auxiliary tank 23 and surrounding the bowls or troughs. Thus the water is kept in proper condition for use even in severe winter weather. Inasmuch as every bit of the heated air rising from the burner 17 is utilized for the purpose of heating the water in the tanks, it is obvious that a relatively small amount of fuel will be required.

I do not wish to be limited to any particular character of burner 17, though preferably a gasoline burner will be used. The burner is to be adjusted according to the temperature of the season and either a high degree of heat may be used or a very small degree of heat, just enough to keep the water from freezing in winter and keep ice from forming in the drinking troughs. It will be seen that the heat will pass through the preheating pipes or tubes 22 so that the heat will circulate through the main supply tank as well as surrounding the auxiliary supply tanks 23.

While I have illustrated certain details of construction and arrangement of parts, I do not wish to be limited thereto, as it is obvious that these details may be changed in many ways without departing from the spirit of the invention. It is to be understood that a plurality of troughs or drinking bowls may be arranged in connection with each main tank and that the main tank may be relatively long and the plurality of bowls each with its accompanying trough be disposed along the sides of the main tank, or that four troughs may be arranged one on each side of the main tank and one at each end of the main tank, and that all of the troughs and all of the auxiliary tanks connected therewith may be supplied from the single main tank and the water in the main tank and the auxiliary tanks and the drinking troughs may all be warmed by a single burner.

It is pointed out that one of the advantages incident to using the tank 23 in connection with each drinking trough and carrying the water from the main tank into this tank 23 and then discharging the water from the tank 23 into the drinking trough is that heat will surround this relatively small supply tank 23 on all four sides so that only a relatively small amount of heat need be used, as the water is preheated in the large or main supply tank before coming into the small supply tanks. This permits the hogs to have warm water at all times. The amount of water given to each hog is regulated by the size of the small supply tank, which are made in sizes from one quart to one gallon more or less so that the water is not wasted.

The tubular passages or tubes 22 extending upward through the main water tank cause the heat to be circulated through this tank, making the water warm and allowing all fumes and gases to escape through the top of the tank through vent holes 51 in the top cover 14. There are no openings in the base of the tank, except a doorway normally closed by a door 52 whereby the gas burner may be ignited. Inasmuch as the lamp 17 or heater is entirely enclosed, there is no possibility of the lamp or heater blowing out or be dangerous to the animals.

It will be seen that water is heated in both tanks and that all the water troughs are also heated so that ice cannot collect. The water which the hog does not drink is drained out through the drainage opening, thus making the trough sanitary, as one hog does not drink the water into which the other hog has dipped his snout, and each hog gets a fresh drink of water. The construction is compact, sanitary, and is thoroughly effective in actual practice.

While I have shown push valves for the purpose of controlling the passage of water from the main tank to the auxiliary tanks 23 and from these auxiliary tanks to the drinking troughs, and for controlling the outlet of drainage water from the drinking troughs, it is obvious that other forms of valves might be used operatively connected to and operated by the levers 42 and which will achieve the same end.

I claim:—

1. A watering tank of the character described including a main tank adapted to be filled with water, a drinking trough having a drainage passage, an auxiliary tank having a supply pipe leading from the main tank and having a pipe leading to the drinking trough, a treadle, and means operatively connected to the treadle acting upon a depression of the treadle to permit flow of water from the auxiliary tank to the drinking trough and cutting off the supply of water from the main tank to the auxiliary tank and acting upon a release of the treadle to cut off communication between the auxiliary tank and the trough, open the drainage passage from the trough and open communication between the main tank and the auxiliary tank.

2. In a stock watering tank, a main tank, a chamber forming the base of said main tank and having heating means disposed therein, an auxiliary tank disposed within said chamber and receiving water from the main tank, a drinking trough forming part of the wall of said chamber and having a drainage passage, a pipe leading from the auxiliary tank to said trough, a heater disposed within the chamber, an animal actuated treadle associated with the trough and normally urged to an elevated position, a valve controlling the passage of water from the main tank to the auxiliary tank, a valve controlling the flow of water from the auxiliary tank to the trough, and a valve controlling the flow of water out through said drainage passage, and means actuated by a depression of the treadle closing the valve between the main tank and the auxiliary tank, opening the valve between the auxiliary tank and the trough, and closing the valve controlling drainage from said trough, and upon the elevation of the treadle opening said drainage valve, closing the valve between the auxiliary tank and the trough and opening the valve between the main tank and the auxiliary tank.

3. A stock watering tank of the character described comprising a main tank, a chamber forming the base of said main tank, a heater disposed within said chamber, tubular heating members extending upward from said chamber and into the main tank, an auxiliary tank disposed within the chamber and having a pipe connection thereto, a drinking trough forming part of the wall of said chamber and having a pipe connection to the auxiliary tank and having a drainage passage, a valve controlling the flow of water from the main tank to the auxiliary tank, a valve controlling the flow of water from the auxiliary tank to the drinking trough, a valve controlling the drainage passage, a lever mounted below the trough and coacting with said valves, a treadle disposed in conjunction with the drinking trough and resting upon said lever, a spring urging the outer end of the lever and treadle upward, a depression of the treadle and of the outer end of the lever causing the lever to close the valve controlling the flow of water from the main tank to the auxiliary tank, open the valve controlling the flow of water from the auxiliary tank to the trough and to close the drainage valve, an elevation of the forward end of the lever and the trough acting to open the drainage valve, close the valve controlling the flow of water to the trough, and open the valve controlling the flow of water from the main tank to the auxiliary tank.

4. A drinking tank of the character described comprising a main tank, a chamber forming the base of the main tank, a compartment above the main tank having a filling opening, a lid closing said compartment, a burner disposed within the chamber, a fuel tank disposed in said compartment and having a pipe leading to said burner, tubular members extending upward from the bottom of the main tank and extending through the main tank whereby heat from said chamber may heat the water in the main tank, auxiliary tanks disposed within the chamber and subjected to the heat therein and each having a pipe connection to the main tank, a valve in said pipe connection normally permitting the flow of water from the main tank to the auxiliary tanks, drinking troughs formed in the outer walls of said chamber, each drinking trough having a pipe connection to a corresponding auxiliary tank, there being a valve in this pipe connection normally preventing the flow of water from the auxiliary tank to the trough and each trough having a drainage passage, a normally open valve controlling flow through said drainage passage, pivoted treadles carried upon said chamber and forming part thereof, the inner edges of said treadles being coincident with the outer edges of the drinking troughs, levers pivoted upon the base of said chamber and disposed therein and extending beneath the drinking troughs, the outer end of each lever being disposed beneath and supporting the corresponding treadle, and springs urging the outer ends of the levers upward, the levers coacting with said valves to normally open each valve controlling flow from the main tank to the auxiliary tank and normally close the valve controlling the flow of water from an auxiliary tank to its corresponding drinking trough and normally open the drainage valve of the corresponding trough, a depression of the corresponding treadle acting to shift said lever to close the valve controlling flow from the main tank to the auxiliary tank, open the valve controlling flow from the auxiliary tank to the corresponding trough, and close the drainage valve.

5. A stock watering tank of the character described comprising a main tank, an auxiliary tank, and a drinking trough, treadle operated means for permitting the flow of water from the auxiliary tank to the drinking trough and simultaneously cutting off the supply of water from the main tank to the auxiliary tank, said means normally acting to cut off the supply of water from the auxiliary tank to the trough and permit the flow of water from the main tank to the auxiliary tank, a chamber enclosing the auxiliary tank and into which chamber the trough extends, the upper wall of the chamber forming the bottom of the tank, heating tubes extending upward from said chamber and through said main tank, and a heating means disposed within the chamber, the bottom of the main tank forming the upper end of said chamber.

6. A stock watering tank of the character described comprising a main tank, a chamber forming the base of the main tank, the side walls of said chamber being inwardly extended, then downwardly and upwardly extended to form drinking troughs or bowls, the base of said chamber being outwardly extended beyond the outer edges of said troughs or bowls, treadles provided upon said outwardly projecting portions of the base of the chamber, the inner ends of the treadles being coincident with the outer edges of said troughs, auxiliary tanks disposed entirely within said chamber, supply pipes extending from the main tank to said auxiliary tanks and having normally open valves therein, pipes connecting each auxiliary tank to a corresponding trough and each having a normally closed valve therein, each trough having a drainage passage and a normally open valve controlling the flow therethrough, heating means disposed within said chamber to heat the air therein, the bottom of the main tank having tubular members extending upward from said chamber into the main tank to heat the water therein, and levers, one for each drinking trough and pivoted to the base of said chamber, each lever having a short arm extending up exterior to the corresponding trough and having its outer end disposed beneath the corresponding treadle, the long arm of the levers extending upward and being operatively engaged with the valves controlling the flow of water from the main tank and the flow of water from the auxiliary tank, the short arm of each lever having a lug operatively engaging the corresponding valve controlling drainage whereby as a treadle is depressed the inner end of the corresponding lever will be raised to close the valve controlling flow from the main tank to the auxiliary tank and open the valve controlling flow from the auxiliary tank to the trough, the lug on the short arm of the lever closing the drainage valve, the elevation of the treadle and the consequent movement of the lever permitting said valves to return to their normal position.

In testimony whereof I hereunto affix my signature.

ALFRED JAMES BERRIEN.